United States Patent

[11] 3,583,730

| [72] | Inventor | Jozef A. Kozlowski<br>Los Angeles, Calif. |
|---|---|---|
| [21] | Appl. No. | 751,601 |
| [22] | Filed | Aug. 9, 1968 |
| [45] | Patented | June 8, 1971 |
| [73] | Assignee | General Connectors Corporation<br>Burbank, Calif. |

[54] DUAL FIRE RESISTANT SEAL
5 Claims, 6 Drawing Figs.

[52] U.S. Cl. .................................................. 285/47,
285/351, 285/367, 277/58
[51] Int. Cl. ............................................. F16l 11/12
[50] Field of Search .......................................... 285/45, 47,
48, 233, 234, 351, 352, 365, 366, 367, 424, 347;
277/58

[56] References Cited
UNITED STATES PATENTS

| 1,830,782 | 11/1931 | Burnish et al. ................. | 285/367X |
| 2,422,158 | 6/1947 | Wolfram ...................... | 285/233 |
| 2,724,602 | 11/1955 | Carey et al. ................... | 285/351X |
| 3,206,229 | 9/1965 | Kramer ....................... | 277/205X |
| 3,246,793 | 4/1966 | Wade .......................... | 285/365X |

FOREIGN PATENTS

| 1,231,977 | 1/1967 | Germany ...................... | 285/367 |
| 410,196 | 5/1934 | Great Britain ................ | 285/45 |

Primary Examiner—Dave W. Arola
Attorney—Lyon & Lyon

ABSTRACT: A dual fire resistant seal for conduits, particularly intended for high speed aircraft, and so arranged that one seal is exposed to a greater extent than the other to a region of high temperature, and under conditions of excessive temperature may undergo ablative action while protecting the other seal, both seals being constrained by a common clamp band.

PATENTED JUN 8 1971

3,583,730

INVENTOR.
JOZEF A. KOZLOWSKI
BY Lyon & Lyon
ATTORNEYS 3,583,730

DUAL FIRE RESISTANT SEAL

SUMMARY OF THE INVENTION

The objects of this invention include:

First, to provide a dual fire resistant seal for conduits which is intended to use the type of seal member disclosed in U.S. Pat. No. 3,206,229, or the type of seal member disclosed in copending application, Ser. No. 789,669, filed Jan. 8, 1968; one seal member being more fully protected against heat damage than the other.

Second, to provide a seal for conduits in which two seal rings are clamped by a single clamp structure, which presses the seal rings toward each other to compress the seal rings axially thereby effecting radial expansion in order to form a seal.

Third, to provide a seal, as indicated in the preceding objects which, when arranged for protection against external heat, the seal rings are enclosed in peripheral channel rings capable of axial compression; the channel rings being engaged by a clamping structure having limited bearing contact therewith and otherwise spaced therefrom.

Fourth, to provide a seal for conduits which, when arranged for protection against internal heat, one seal ring is supported on a spacer having minimum heat conductive contact with the walls of the conduit, both seal rings are received in axially compressible channel rings engaged by a common clamping structure to squeeze the seal rings toward each other.

Fifth, to provide a dual seal for conduits in which a seal is selected for its sealing properties and the other for its fire resistance properties even to the extent that if used alone it might leak.

Sixth, to provide a dual seal for conduits which does not require extreme accuracy in manufacture, so that it may be adapted to oval conduits as well as round.

Figure 1:
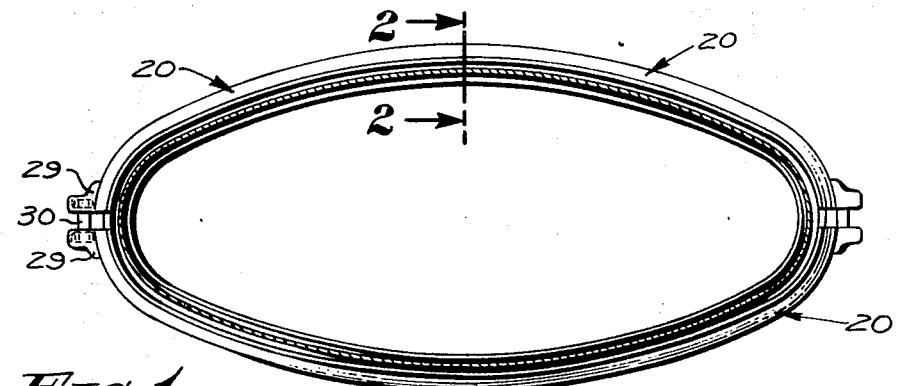
FIG. 1 is a transverse sectional view of a conduit, with the seal mounted thereon and shown in end elevation.

The dual fire resistant seal includes an inner band or wall 1, which in the construction illustrated, is indicated as being oval in form; however, it may be circular. In its axial direction, the band is flat, except for an inturned end 2. The opposite end of the band is joined to a conforming conduit section 3.

An outer band or wall 4 is also provided. The outer band includes a radially inner margin 5, which joins a first sloping shoulder 6, that in turn is joined to an intermediate land 7, internally dimensioned to clear the inner band 1. The intermediate land is joined to a second radial shoulder 8, the radially outer end of which is joined to an outer land 9 having an offset 10 approximately equal to the thickness of the metal comprising the outer band 4. The outer band 4 is joined to the second conduit section 11.

An L-ring 12, which includes an axial portion 13 and a radial portion 14 telescopes within the extremity of the outer land 9. A partition ring 15 is slidably positioned within the outer land 9. The shoulder 8, radial portion 14 and partition ring 15 form the sidewalls of a pair of seal ring channels 16 and 17, which receive seal rings 18 and 19.

The outer band 4 is enclosed in a clamp band comprising two clamp band sections 20. Each clamp band section 20 forms a relatively large channel 21, bounded by a radial flange 22 and a sloping flange 23, joined by a connecting web 24. The extremities of the flanges 22 and 23 are joined to axially directed margins 25 and 26. In order to align the clamp band sections properly, each margin 26 is provided with a notch 27, and the inner band 1 is provided with a boss 28. The extremities of the sections 20 are provided with clamp lugs 29, joined by bolts 30.

Figures 2, 3:
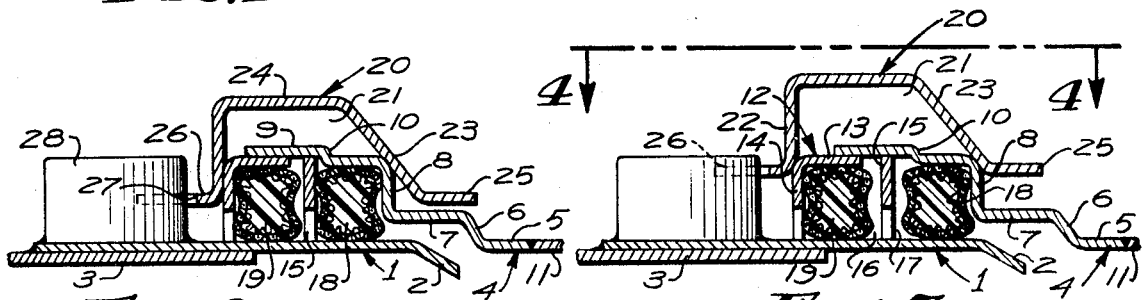
FIG. 2 is an enlarged fragmentary sectional view, taken through 2-2 of FIG. 1, showing the seal in its secured condition.
FIG. 3 is a similar enlarged fragmentary sectional view, as it appears when assembled, but before the clamp has been tightened.

Operation of the dual fire resistant seal is as follows:

The parts are assembled, as shown in FIG. 3. The clamp sections are then tightened toward each other, causing the flanges 22 and 23 to compress the channels 16 and 17 axially, and thus pressing the seal rings 18 and 19 until they seal the connection between the two conduits.

The seal is intended primarily for aircraft, under conditions in which the exterior of the conduits and the seal may be subject to destructive heat. It is essential, under such condition, that the integrity of the seal be maintained for an appreciable period of time; for example, until the cause of the excessive heat may be remedied, a fire be put out, the aircraft make an emergency landing, or if feasible until the occupant or occupants bail out. It will be noted that the radial depth of the clamp band sections 20 is rather substantial, providing an insulating space above the seal rings. In addition, the outermost seal ring 18 may be formed of heat resisting material such as glass cloth or asbestos, or have a greater wall thickness of such material around its core. It is well known that this increases the difficulty in effecting a seal. However, by providing two seal rings, the outermost seal ring need not be as an effective seal as the innermost seal ring. Thus, the innermost seal ring 18 may be designed to perform the primary sealing function, whereas the outer seal ring 19 may be less effective in this regard, but highly effective to protect the inner seal, and in fact, may be actually destroyed before it fails to protect the inner seal.

The clamp band sections 20 perform another function by reason of the relatively great radial depth of the flanges 22 and 23, and the provision of the axially directed marginal flanges 25 and 26. The clamp band sections may be quite stiff; as a result, when the sections are tightened, they tend to force the engaged portions of the outer band or wall assembly formed by the band 4, L-ring 12 and radial ring 15, into conformity therewith, thus, compensating for the fact that it is more difficult to establish close tolerances for an oval shape than it is for a circular shape.

It should be noted, however, that the seal may be constructed in circular form, if desired.

Figure 5:
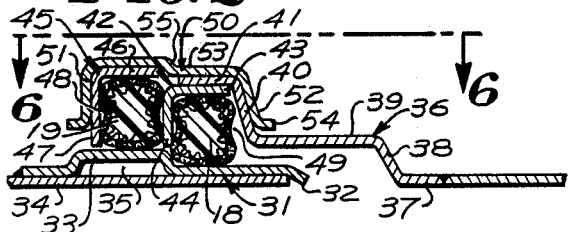
FIG. 5 is a sectional view, similar to FIG. 2, showing a modified form of the seal, taken through 5-5 of FIG. 6.
Figure 4:
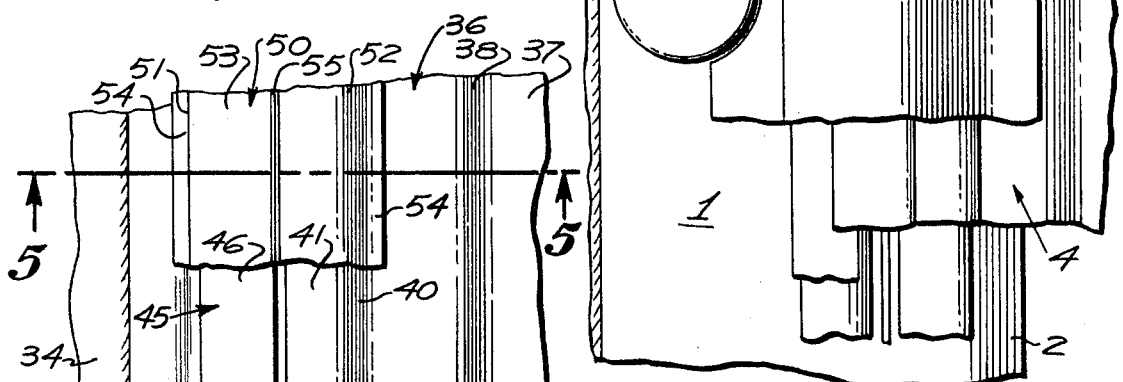
FIG. 4 is a fragmentary plan view, taken from 4-4 of FIG. 3.
Figure 6:
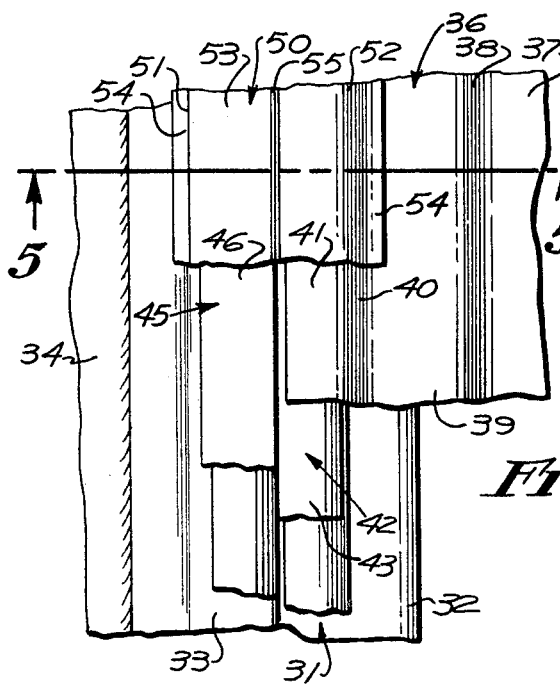
FIG. 6 is a fragmentary plan view, taken from 6-6 of FIG. 5.

Reference is directed to FIGS. 5 and 6. The construction here illustrated is adapted to a condition in which the conduit may carry high temperature fluids. The modified construction includes an inner band 31, having an inturned end 32 and an external hollow rib 33. The band 31 overlays a conduit section 34, and forms therewith in the region of the hollow rib 33, an insulating space 35.

An outer band 36 is provided which includes an axial margin 37, joined to a first shoulder 38, which in turn, is joined to an intermediate land 39, clearing the inner band 31. The land 39 joins to a second shoulder 40, which in turn is joined to an outer land 41.

A first L-ring 42, having an axial portion 43 and a radial portion 44 is telescopically received under the outer land 41. Mounted over the hollow rib 33 is a second L-ring 45, also comprising an axial portion 46 and a radial portion 47.

The second shoulder 40 and outer land 41 form with the first L-ring 42, a seal ring channel 48. A second seal ring channel 49 is formed by the radial portion 44 of the first L-ring and the axial and radial portions of the second L-ring 45. The seal ring channels receive the seal rings 18 and 19, except that the internal fire resistant seal 18 is located inwardly of the other ring, which rests on the hollow rib 33.

The elements forming the two seal ring channels 48 and 49 are encased in a clamp band 50, which may comprise two sections as in the first described structure, or may be a single member, split at one point in its circumference. The clamp band 50 may, in fact, be identical to the clamp band sections 20, but is shown as conforming closely to the elements which form the two seal ring channels. More particularly, the clamp band 50 includes a radial flange 51, a sloping flange 52, a connecting web 53, and axially directed margins 54. The web 53 is provided with an offset 55 to accommodate the different radial dimensions of the L-rings 42 and 45.

As in the first described structure, when the clamp band 50 is tightened, the axial ends of the wall assembly which forms the two channels are compressed axially so that the seal rings are compressed axially to bring them into sealing contact with the surrounding walls. As indicated previously, the inner seal ring 18 is constructed so as to have higher temperature resistance than the seal ring 19, and in this case, serves to protect the seal 19 against high temperature fluids flowing within the conduit.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. A fire resistant seal structure joining a pair of coaxial conduits, comprising:
   a. means forming an inner wall extending from one of said conduits;
   b. means forming an outer wall extending from the other of said conduits over the first means;
   c. means including said inner and outer wall means defining a pair of peripheral channels, one of said channels being more exposed to destructive heat than the other;
   d. and a pair of seals in said channels;
   e. one of said seals being more fire resistant than the other seal and disposed in the more exposed channel, thereby to protect the other seal in the less exposed channel;
   f. said other seal being yieldable under pressure to a greater extent than the seal in the more exposed channel, thereby to effect a sealing fit under lesser loads than the more fire resistant seal.

2. A seal structure, as defined in claim 1, wherein:
   a. said channel forming means are axially contractable to engage said seals;
   b. and clamp means engage said outer wall means to effect said axial contraction.

3. A seal structure, as defined in claim 2, wherein:
   a. said clamp means includes relatively diverging end walls engaging the remote axial corners of said channel forming means and a connecting wall clearing said channel forming means to form a heat transfer retarding means.

4. A seal structure for joining a pair of coaxial conduits, comprising:
   a. an inner wall extending from one of said conduits;
   b. an outer wall assembly extending from the other conduit over the inner wall, said outer wall assembly including radial elements and connecting elements forming a pair of contiguous channels confronting said inner wall, said connecting elements being relatively movable to compress and expand said channels, one of said channels being more exposed to destructive heat than the other;
   c. a pair of seals received in said channels;
   d. one of said seals having fire resistant covering and disposed in said exposed channel;
   e. the other of said seals being yieldable under pressure to a greater extent than the first seal and disposed in the less exposed channel;
   f. and clamp means engaging said outer wall assembly to compress said channels and effect a sealing connection between the walls of said channels and said seals.

5. A seal structure for joining a pair of coaxial conduits, comprising:
   a. an inner wall extending from one of said conduits;
   b. an outer wall assembly extending from the other conduit over the inner wall, said outer wall assembly including a first member forming a radial wall of a first annular channel and an axial wall of said first channel and a second annular channel, a second member forming a radial wall of the second channel and an axial wall telescoping with the axial wall of the first member, and a radial wall member separating said channels, said radial walls being relatively movable to compress and expand said channels;
   c. a pair of seals received in said channels;
   d. and clamp means engaging said outer wall assembly to compress said channels and effect a sealing connection between the walls of said channels and said seals.